(12) United States Patent
Tabak

(10) Patent No.: US 8,577,828 B2
(45) Date of Patent: Nov. 5, 2013

(54) SYSTEM, METHOD AND COMPUTER-ACCESSIBLE MEDIUM FOR NORMALIZING DATABASED THROUGH MIXING

(75) Inventor: Esteban G. Tabak, New York, NY (US)

(73) Assignee: New York University, New York, NY (US)

( * ) Notice: Subject to any disclaimer, the term of this patent is extended or adjusted under 35 U.S.C. 154(b) by 433 days.

(21) Appl. No.: 12/808,153

(22) PCT Filed: Dec. 12, 2008

(86) PCT No.: PCT/US2008/086589
§ 371 (c)(1),
(2), (4) Date: Aug. 17, 2010

(87) PCT Pub. No.: WO2009/076600
PCT Pub. Date: Jun. 18, 2009

(65) Prior Publication Data
US 2010/0312745 A1    Dec. 9, 2010

Related U.S. Application Data

(60) Provisional application No. 61/013,105, filed on Dec. 12, 2007.

(51) Int. Cl.
*G06F 9/44* (2006.01)
*G06N 7/02* (2006.01)
*G06N 7/06* (2006.01)
(52) U.S. Cl.
USPC .......................................................... 706/52

(58) Field of Classification Search
USPC .......................................................... 706/52
See application file for complete search history.

(56) References Cited

U.S. PATENT DOCUMENTS 6,591,235 B1 * 7/2003 Chen et al. .................... 704/236

OTHER PUBLICATIONS

Lee, Lung-fei "Generalized Econometric Models with Selectivity" Journal of the Econometric Society 1983 [ONLINE] Downloaded Sep. 13, 2012 http://conservancy.umn.edu/bitstream/55071/1/1981-140.pdf.*
Written Opinion for International Application No. PCT/US2008/086589 mailed on Jul. 6, 2009.

* cited by examiner

*Primary Examiner* — Ben Rifkin
(74) *Attorney, Agent, or Firm* — Dorsey & Whitney LLP

(57) ABSTRACT

An exemplary methodology, procedure, system, method and computer-accessible medium can be provided to assign a joint-probability distribution to a set of continuous variables, given a sample of independent joint observations. The exemplary embodiments can transform at least a portion of particular data into transformed data, repeat the transformation until a marginal distribution of at least the portion of the particular data has been transformed to be at least sufficiently near or to reach a predetermined distribution, and estimate at least one likelihood of at least one predetermined result associated with the particular data as a function of the transformed data, whereas the repeated transformation ascends a likelihood function and/or is performed by unitary transformations.

40 Claims, 6 Drawing Sheets

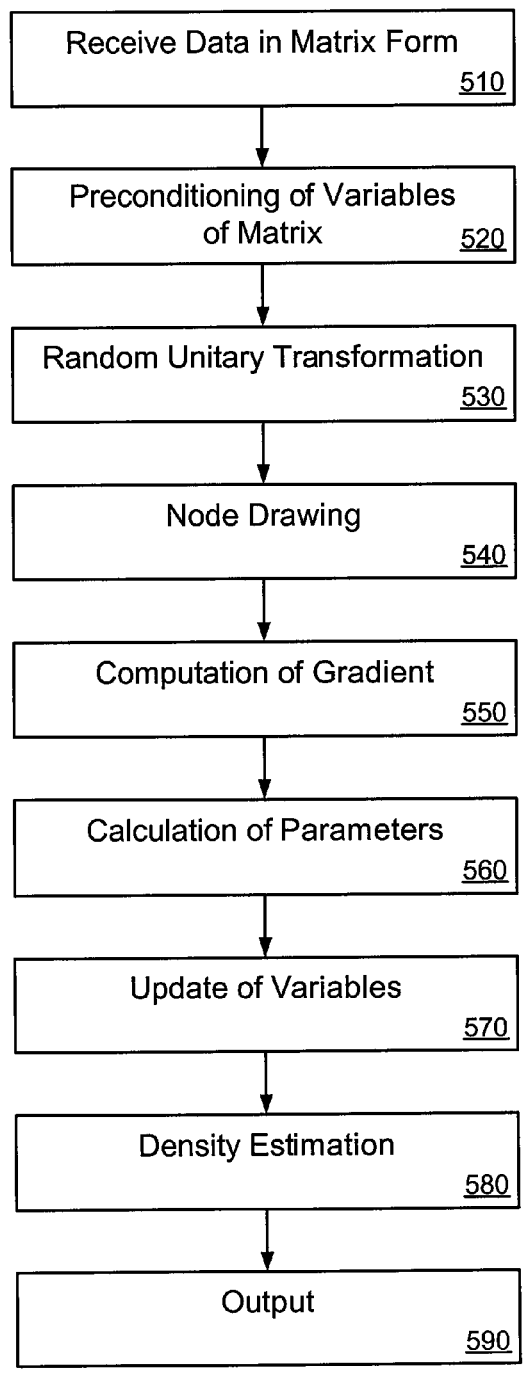
F I G. 5

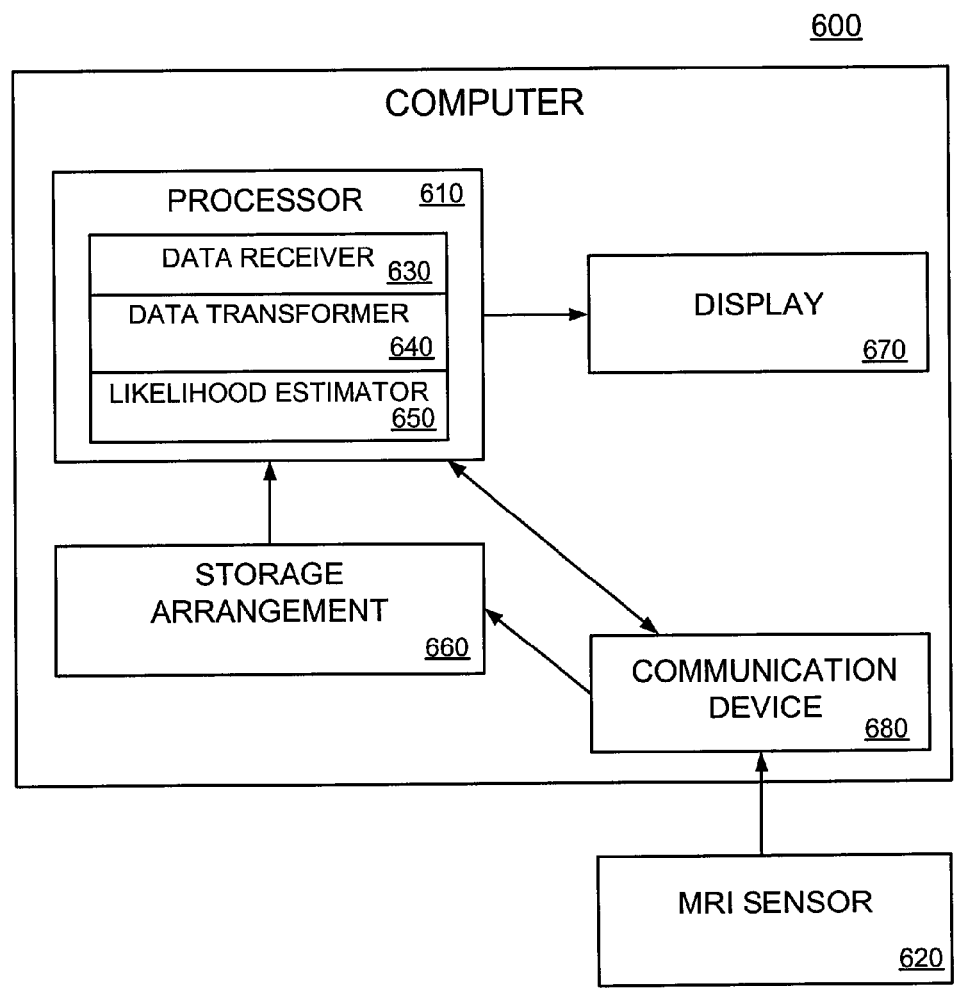
F I G. 6

SYSTEM, METHOD AND COMPUTER-ACCESSIBLE MEDIUM FOR NORMALIZING DATABASED THROUGH MIXING

CROSS-REFERENCE TO RELATED APPLICATIONS

The present application is a U.S. National Phase of International Application PCT/US2008/086589 filed Dec. 12, 2008 and also relates to and claims priority from U.S. Patent Application Ser. No. 60/013,105, filed Dec. 12, 2007, the entire disclosures of which are hereby incorporated herein by reference.

FIELD OF THE INVENTION

The present invention relates to exemplary embodiments of a system, method and computer-accessible medium for normalizing databases through mixing, and use thereof in data mining, e.g., including importance sampling, dimensional reduction, and data estimation (e.g., diagnosis and forecasting).

BACKGROUND INFORMATION

Extracting information from data is a fundamental problem underlying many applications. In the health sciences field, e.g., it may be preferable to extract from census and surveys causal relations between habits and health. A medical doctor may prefer to diagnose the health of a patient based on clinical data, blood tests and, currently, genetic information. Pharmaceutical companies generally investigate the effects on health of drugs in various dosages and combinations. Financial companies generally assess, based on the available data, the probability that many credit-lines default within the same time-window. Market analysts attempt to quantify the effect that advertising campaigns have on sales. Weather forecasters prefer to extract from present and past observations the likely state of the weather in the near future. Climate scientists are pressed to estimate long-time trends from observations over the years of quantities such as sea-surface temperature and the concentration of $CO_2$ in the atmosphere. Clearly, the list of applications can be lengthy.

In many of these applications, the fundamental "data problem" can be posed as follows: a set of m joint observations of n variables is provided, and it may be important to estimate the probability that a function of these variables may be within a certain range in a new observation. Thus, the financial analyst dealing in credit derivatives generally seeks the probability of joint default; the medical doctor, the likelihood that some reported symptoms and measurements are associated with a certain disease; the weather forecaster—the likelihood that the pattern of today's measurements anticipates tomorrow's rain, etc. Thus, there remains a need for estimating a likelihood based on the various data.

SUMMARY OF EXEMPLARY EMBODIMENTS OF THE INVENTION

The above described problems can be addressed by exemplary embodiments of the system, method and computer accessible medium according to the present invention. For example, using such exemplary embodiments, it is possible to transform at least a portion of particular data into transformed data, repeat the transformation until a marginal distribution of at least the portion of the particular data has been transformed to be at least sufficiently near or to reach a predetermined distribution, and estimate at least one likelihood of at least one predetermined result associated with the particular data as a function of the transformed data, whereas the repeated transformation ascends a likelihood function and/or is performed by unitary transformations.

The repeated transformation can further comprise a combination of a change of coordinates, which are linear and unitary, and low-dimensional near-identity transformations that move at least one or more marginals of a probability distribution underlying the transformed data toward corresponding marginals of the predetermined distribution.

The likelihood function can be a log likelihood function, and the unitary transformations can be uniformly distributed. The transformation can be performed by at least one-dimensional non-linear transformations, or by a near identity transformation. The transformation can preferably be a low-dimensional transformation compared to a number variables in the data.

The processing arrangement can be further configured to receive the particular data in at least a one-dimensional format. The predetermined distribution can be a Gaussian distribution, or an isotropic Gaussian distribution. The transformed data can satisfy a predetermined Gaussianity evaluation. A portion of the particular data can be transformed using a near-identity transformation procedure, or a random orthogonal transformation which rotates the particular data. The particular data can have a form of an n×m matrix, whereas m is associated with independent observations of n variables.

BRIEF DESCRIPTION OF THE DRAWINGS

The foregoing and other objects of the present invention will be apparent upon consideration of the following detailed description, taken in conjunction with the accompanying drawings and claims, in which like reference characters refer to like parts throughout, and in which:

FIG. 5 illustrates a flow diagram according to another exemplary method of the present invention; and FIG. 6 illustrates a block diagram of an exemplary embodiment of a system according to the present invention.

Figure 1:
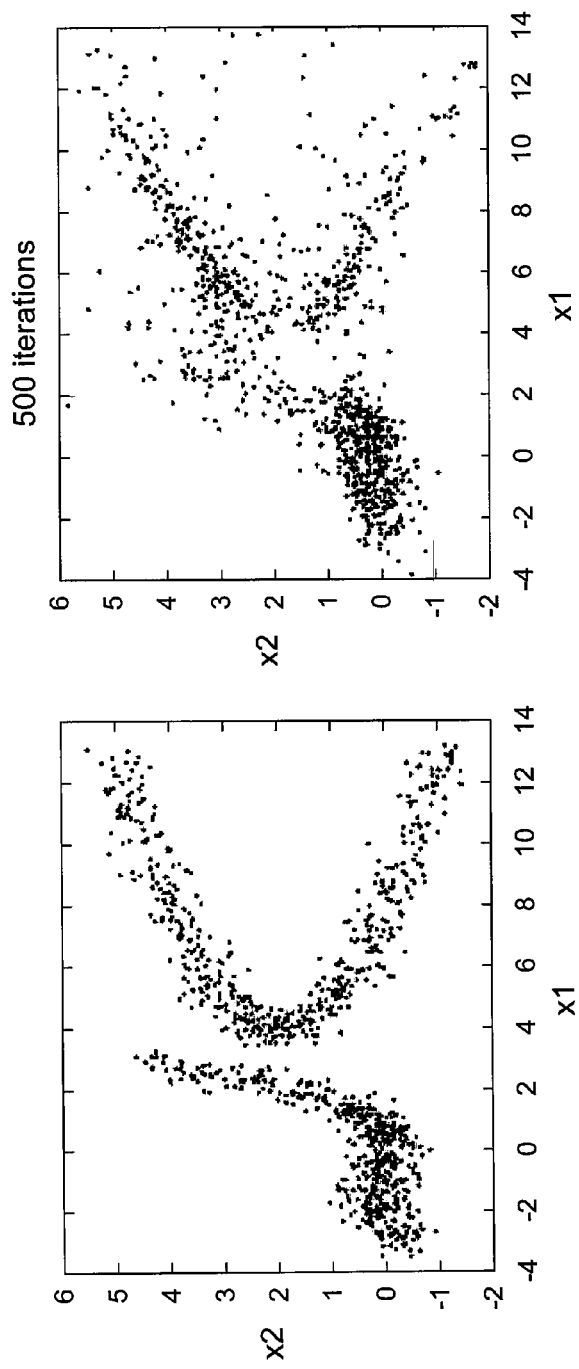
FIG. 1 is an illustration of an exemplary two-dimensional distribution.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention.

DETAILED DESCRIPTION OF EXEMPLARY EMBODIMENTS OF THE INVENTION

Exemplary embodiments of the methodology and procedure which can be implemented by exemplary embodiments of the system, method and computer-accessible medium according to the present invention can use predetermined or given observations to construct a candidate joint probability distribution of the observed variables which is associated with one or more predetermined results.

For continuous variables, a form of a probability density, $\rho(x_1, \ldots, x_n)$, can be estimated where the probability that an observation x be in the n-dimensional set A is provided by:

$$P(x \in A) = \int_A \rho(x_1, \ldots, x_n) dx_1 \ldots dx_n.$$

This exemplary density can be provided such that it may facilitate an easy implementation of two exemplary complementary tasks, e.g., (i) the evaluation of $\rho(x)$ at any given point x, and (ii) the drawing of a new sample of points $x^j$ from the distribution. The above-described latter task can be useful for Monte Carlo simulations and importance sampling, e.g., an effective way to estimate the expected value of an arbitrary function $f(x)$.

An exemplary procedure to assign a joint probability distribution to the set of variables according to an exemplary embodiment of the present invention can include a transformation of such variables, e.g., iteratively, into another set for which the distribution is known. This exemplary procedure can be performed using a computer which can be configured when executing one or more software programs which may be stored on a storage arrangement which is connected to or associated with such computer. For example, the knowledge of the transformation and of the probability distribution in the target space can automatically assign a distribution to the original variables. For the target space, a jointly-Gaussian probability density can be utilized according to exemplary embodiments of the present invention. Such exemplary probability density can be utilized because, in the process of transforming the original, e.g., unknown joint probability into a Gaussian probability, the attractive nature of normal distributions can be utilized. For example, the transformation can be in the direction of increasing entropy, without loosing any information during the procedure, e.g., by keeping track of most or all the transformations performed.

Each iteration of the procedure according to the exemplary embodiment of the present invention can include the following steps, e.g., (i) a variable-by-variable near-identity map that moves the underlying marginal distribution of each variable toward normality, and (ii) a linear transformation that can "mix" most or all of the variables into a new set. In the one particular implementation of the exemplary procedure, this transformation can be selected randomly among most or all of the orthogonal transformations. The randomness of the choice is not necessary. Indeed, the surety that the variables are mixed uniformly enough may be sufficient, in one exemplary embodiment of the present invention. The orthogonal character of the transformations may be relaxed as well. Orthogonal transformations have the following exemplary advantages, e.g., they (i) preserve area—and hence probability density, and (ii) provide equal weights for most or all variables. Any generalization to a wider class of transformations can satisfy at least an approximate version of these properties. Orthogonal transformations can be viewed as generalized rotations, that look at the space of variables from a particular viewpoint.

The exemplary embodiment of the procedure can converge when the marginal distribution of all variables is normal, and can remain so converged under further rotations. This implies that the variables form a jointly-Gaussian set.

This exemplary methodology, procedure, system and method according to the exemplary embodiments of the present invention can be used within and or in conjunction with the existing technology. First, e.g., the general problem of extracting information from data relates to data mining, machine learning and statistical learning biostatistics when applied to the biological sciences, etc. Hastie, T. et al., "The Elements of Statistical Learning", Springer, 2001, the entire disclosure of which is incorporated herewith by reference, describes such subject matter. Within data mining, the exemplary embodiment of the present invention can be operable within the framework of unsupervised learning since there may be little or no distinction between dependent and independent variables.

The exemplary embodiment of the procedure according to the present invention may involve parametric families at the time of performing the Gaussianizing maps, though such involvement can be in a non-essential way. For example, the maps may be provided to be close to the identity, which can diminish the distinction between families. Moreover, a number of maps can be performed over the iterative part of the exemplary procedure, and thus the number of available parameters can become effectively infinite.

Within unsupervised learning, the exemplary embodiment of the procedure according to the present invention can have a certain degree of commonality with principal component and factor analysis, and be possibly orthogonal to an independent component analysis, in that the latter explicitly seeks non-Gaussian latent factors to explain the data. However, these exemplary techniques may assume a linear dependence between the data and the latent variables explaining it. The exemplary embodiment of the present invention can be fully nonlinear, e.g., an infinite sequence of maps can facilitate arbitrary and possibly convoluted dependences between the original variables and the final Gaussian set.

With respect to collateral debt obligations (CDO), e.g., a procedure that is based on the Gaussian copulas, this exemplary procedure has recently become widespread for estimating the likelihood of simultaneous defaults. Such exemplary procedure can involve a set of jointly-Gaussian variables. However, this procedure generally does not build such set through a nonlinear transformation (which can be performed by the procedure according to the exemplary embodiment of the present invention), and essentially can assume that the variables have such a distribution to start with. The deficiency of this procedure can be that it can possibly induce errors in the evaluation of credit risks, when the tails of the distributions are not really jointly Gaussian. The exemplary procedure in accordance with the present invention can produce more realistic risk evaluations, and hence more accurate pricings of CDOs.

The exemplary methodology according to the present invention can include an exemplary embodiment of the procedure that can determine a robust approximation to the joint probability distribution underlying the available observations of a set of variables.

For example, assuming that a matrix X is provided, $$X = \begin{pmatrix} x_1^1 & x_1^2 & \ldots & x_1^m \\ x_2^1 & x_2^2 & \ldots & x_2^m \\ \vdots & \vdots & \ddots & \vdots \\ x_n^1 & x_n^2 & \ldots & x_n^m \end{pmatrix} \quad (2.1)$$

of m independent observations of n continuous, possibly related variables $x=(x_1, x_2, \ldots, x_n) \in R^n$.

Exemplary procedure can obtain an explicit representation of the original variables, $x=(x_1, x_2, \ldots, x_n)$, in terms of a set of independent Gaussian variables, $x=(x_1, x_2, \ldots, x_n)$, with $n^*=\min(n,m)$, and where x has mean 0 and standard deviation $\sigma_i$. Both the map $x=\Phi(x)$ and the pre-image $\Phi^{-1}(A)$ of any Borel set $A \in R^n$ are provided by the exemplary procedure. Since the joint probability density function of the former is known, $$g(\bar{x}_1, \bar{x}_2, \ldots \bar{x}_n) = \prod_{i=1}^{n} \frac{e^{-\frac{1}{2}(\bar{x}_i/\sigma_i)^2}}{\sqrt{2\pi}\sigma_i} \quad (2.2)$$

and the pre-image $\Phi^{-1}(A)$ of any Borel set $A. \in R^n$ can also be produced by the exemplary procedure according to the present invention, the desired probability of A can be obtained (e.g., in many applications of interest, when the number of variables n is smaller or equal than obtained the number of observations m, this measure μ can adopt the form of a density, and can be determined directly through the multiplication of g by the Jacobian of the map, which is explicitly available).

$$\mu(A) = \int_{\Phi^{-1}(A)} g(s_1, s_2, \ldots, s_n) ds_1 \ldots ds_2 ds_n, \quad (2.3)$$

Figure 4:
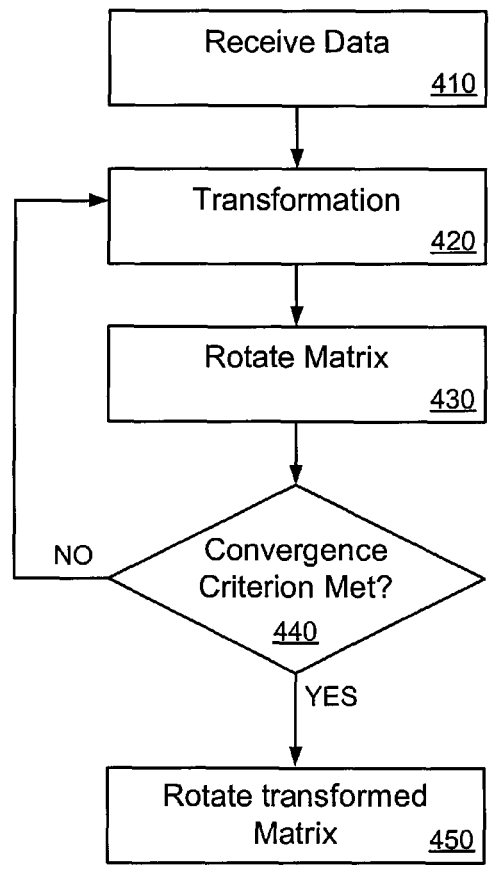
FIG. 4 illustrates a flow diagram according to an exemplary method of the present invention.

The exemplary procedure according to the present invention can include an iterative part that may Gaussianize the variables. One part can include the iteration of certain steps, e.g., a row-by-row (i.e., variable-by-variable) normalizing map, and a random rotation that "mixes" the variables, likely leading to their eventual joint Gaussianization. An exemplary flow of the portion of the exemplary embodiment of the procedure according to the present invention can be as provided as shown in FIG. 4.

For example, data can be received in step 410, which can be in the form of an n×m matrix X corresponding to m independent observations of n variables. Then, at step 420, find and apply to each row of the matrix of the received data a near-identity transformation that moves its underlying marginal probability distribution toward Gaussianity. At step 430, the matrix c may be rotated, which can be through a random orthogonal transformation. Steps 420 and 430 are repeated until a predetermined convergence criterion is met. The convergence criterion may consist of, e.g., the requirement or preference that, for a certain number of successive rotations, the marginal distribution of most rows of the matrix satisfy a Gaussianity test. At step 440, if the convergence criterion is not met, steps 420 and 430 are repeated. If the convergence criterion is met, then at step 450, the transformed matrix can be rotated one last time through the orthogonal transformation that diagonalizes its covariance matrix (i.e., perform its singular value decomposition.)

An exemplary outcome and/or result of the exemplary embodiment of the procedure according to the present invention can be a map between the original variables and a jointly Gaussian set, which may be applied not only at the observed sample, but for any combination of values of the original variables. Thus, an exemplary joint probability distribution of the variables consistent with the observed data can be determined. This exemplary probability distribution can be used to answer essentially all questions that may be posed about these variables, e.g., dimensionality (and parameterization) of the manifold where they live, prediction of the values of one or more variables given observations of the others, relation to other variables. Examples of such applications are described herein below.

The evaluation of the map and its Jacobian on a point or set of points not on the data set can be performed after the central exemplary procedure, e.g., if the parameters of the individual normalizations and the orthogonal matrices used can be maintained; or simultaneously with it. In the latter case, it is possible to concatenate the n×$m_y$ matrix Y of $m_y$ new points to the matrix X of observations, and let Y follow X through the procedure, being normalized and rotated passively alongside X, without influencing the determination of the normalizing parameters.

An illustration of the potential of the exemplary embodiment of the procedure according to the present invention is provided in FIG. 1, in which the sample on the left provides a two-dimensional distribution taken from a given distribution, and the sample on the right provides a two-dimensional distribution taken from a distribution that the procedure estimated. For example, a sample from a nontrivial probability distribution of two variables, concentrated in the neighborhood of two distinct curves, is shown in these portions of FIG. 1. The two exemplary curves can be defined by $$x_0 = t + g, \; y_0 = 0.25t^2 + 0.1t^3 + g$$

and $$x_0 = 4 + t^2 + g, \; y_0 = t + 2 + g$$

where t is equi-distributed between −3 and 3, each curve has probability 1/2, and g is a Gaussian variable with standard deviation 0.3.

The exemplary embodiment of the procedure according to the present invention can be applied to this sample, and the resulting probability distribution assigned to the variables is re-sampled (e.g., taking a sample of the estimated probability can be done by sampling two independent Gaussians, one for each of the final x's, and inverting the map). An acceptable agreement and/or correlation between the new sample, based on the estimated joint-probability distribution and the original distribution, can indicate that the distribution underlying the sample has been well approximated by the exemplary embodiment of the procedure according to the present invention.

Figure 2:
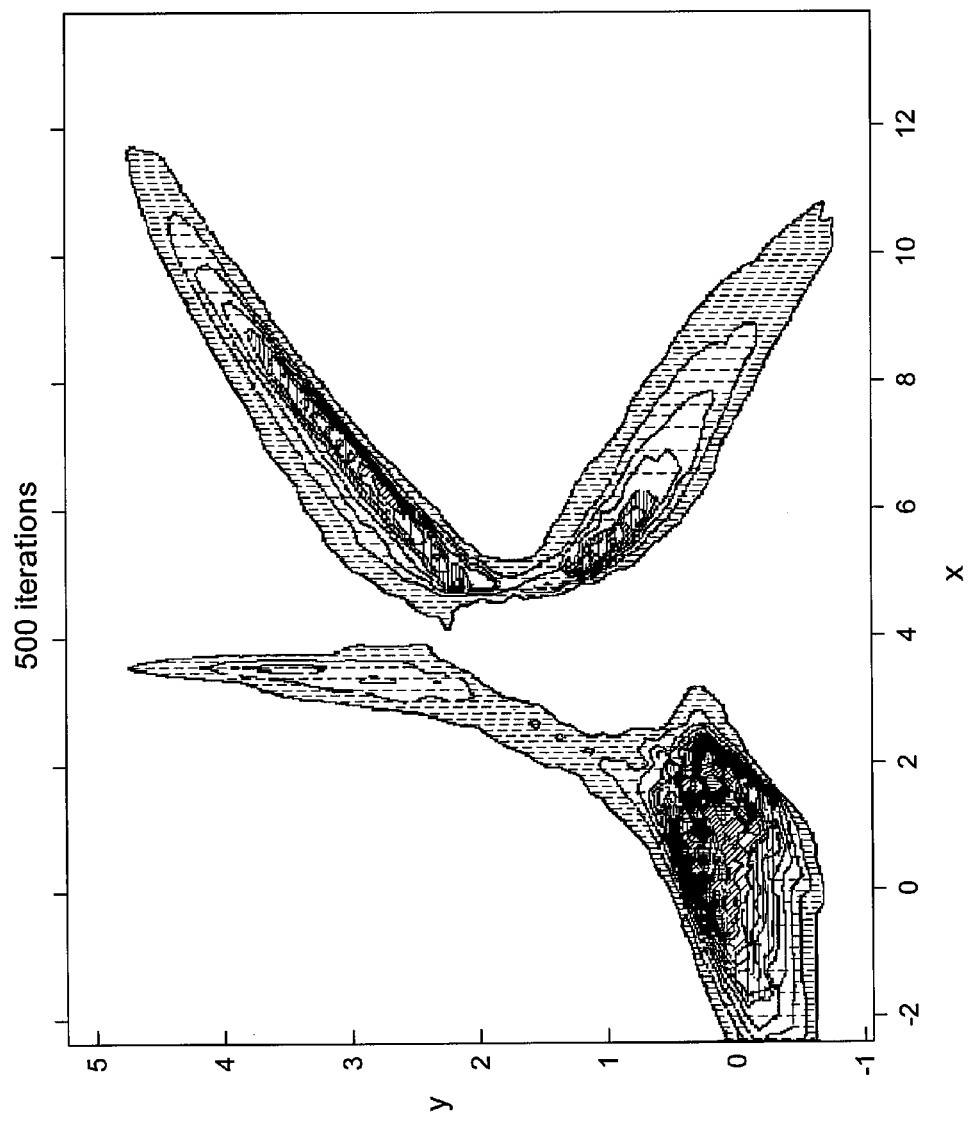
FIG. 2 is an illustration of an exemplary image providing exemplary contours of an estimated probability density for the two-dimensional distribution shown in FIG. 1.

FIG. 2 shows an exemplary image providing exemplary contours of the estimated probability distribution for the two-dimensional distribution illustrated in FIG. 1, evaluated on a regular grid in the original space of variables, which can be carried passively through the maps of the exemplary embodiment of the procedure according to the present invention.

Figure 3:
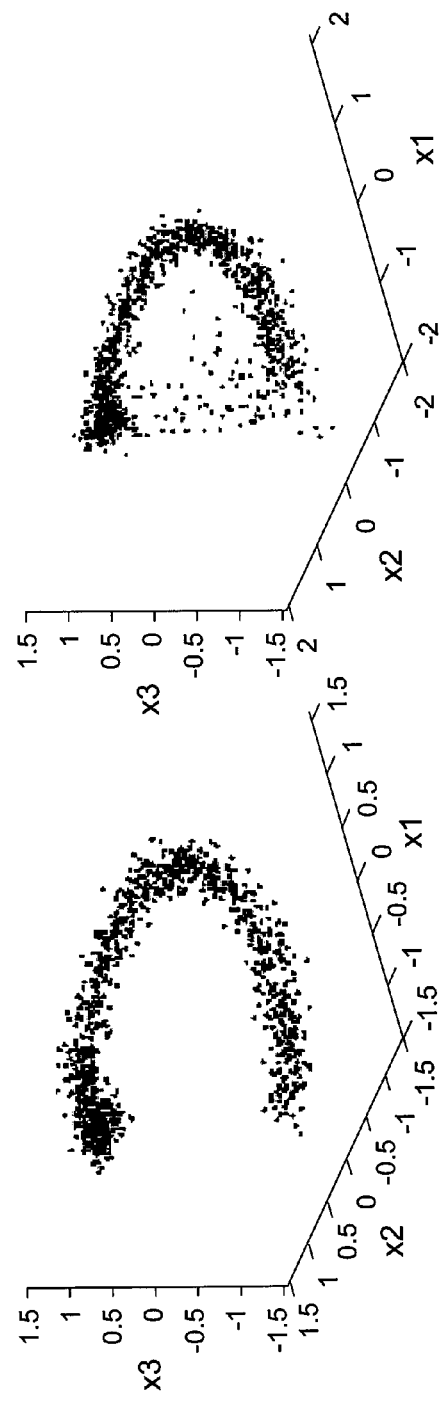
FIG. 3 is an illustration of an exemplary graph providing a three-dimensional distribution concentrated around a helix.

An exemplary three-dimensional exemplary graph is shown in FIG. 3, where the probability distribution is concentrated in the neighborhood of the helix $$x = \cos(t), \; y = \sin(t), \; z = \frac{1}{3}t,$$

with t distributed uniformly in $-\P \le t \le \P$, and the neighborhood is introduced as a Gaussian noise of standard deviation of about 0.1 added to each variable. As shown in FIG. 3, a sample on the left from the given distribution can be used to estimate the joint-probability of the three variables, which is then re-sampled on the right.

FIG. 5 illustrates a flowchart for the density estimation procedure according to another exemplary embodiment of the present invention. Initially, e.g., data can be received at step 510 which may be input as a matrix where the matrix of observations can be m independent observations of n variables, and the grid where the estimated density is to be computed can be k points in n-dimensional space.

$$X = \begin{pmatrix} x_1^1 & x_1^2 & \cdots & x_1^m \\ x_2^1 & x_2^2 & \cdots & x_2^m \\ \vdots & \vdots & \ddots & \vdots \\ x_n^1 & x_n^2 & \cdots & x_n^m \end{pmatrix},$$

$$Y = \begin{pmatrix} y_1^1 & y_1^2 & \cdots & y_1^k \\ y_2^1 & y_2^2 & \cdots & y_2^k \\ \vdots & \vdots & \ddots & \vdots \\ y_n^1 & y_n^2 & \cdots & y_n^k \end{pmatrix},$$

At step 520, a preconditioning procedure can be performed, where the mean may be subtracted from each variable $x_i$, and all variables can be divided by the average standard deviation, defined as the square root of the average of the variance of all variables. Most or all of these exemplary steps and/or procedures, as well as the steps and/or procedures provided for in the exemplary normalization procedure, can also be applied passively to the grid Y. Hence the mean of each $x_i$ is also subtracted from the $y_i$'s, and all y's are divided by the average standard deviation of the x's. The preconditioning step 520 is not required, while it may be convenient. For example, this exemplary step center the distribution at the origin of coordinates, and normalizes its average variance, with just a displacement and a global stretch. This reduces the work that the nonlinear normalization needs to perform.

Next, normalization of the data can take place which can comprise a succession of identical steps. A random unitary transformation is applied to both X and Y at step 530. For each variable $x_i$, at step 540, there is first a random drawing of a node $x_0$. Then at step 550, there is a computation of a gradient of the log-likelihood with respect to the parameters of the one-dimensional, near-identity transformation. At step 560, a calculation of the parameters by descent can be provided, with a step of size $\Delta t$ in the direction of the gradient. Then at step 570, an update of the variables $x_i$ and $y_i$ can be performed by the transformation so determined, and calculation of the corresponding Jacobian. For example, the Jacobians of the various steps can accumulate by a multiplication.

At step 440, the density estimation can take place, where the estimated density evaluated at the grid points $y^j$ can be given by:

$$\rho(y^j) = \frac{J(y^j)}{(2\pi)^{n/2}} \exp\left(-\frac{|y^j|^2}{2}\right),$$

where the $y^j$ in the exponential is the one transformed through the normalization procedures described herein, and J is the corresponding Jacobian, and an output is provided at step 590:

$$\rho(Y)=[\rho(y^1)\rho(y^2)\ldots\rho(y^k)],$$

where the estimated probability density can be evaluated on the grid Y.

If desired, other available outputs can include:

$$Z = \phi(X) = \begin{pmatrix} z_1^1 & z_1^2 & \cdots & z_1^m \\ z_2^1 & z_2^2 & \cdots & z_2^m \\ \vdots & \vdots & \ddots & \vdots \\ z_n^1 & z_n^2 & \cdots & z_n^m \end{pmatrix},$$

where the observation matrix X, transformed into a normal set Z, can be provided by:

$$J(X)=[J(x^1)J(x^2)\ldots J(x^m)].$$

and $$\rho(X)=[\rho(x^1)\rho(x^2)\ldots\rho(x^m)],$$

and the estimated probability density can be evaluated on the observations X

FIG. 6 illustrates a block diagram of an exemplary embodiment of a system according to the present invention. A computer 600 can be provided having a processor 610 which can be configured or programmed to perform the exemplary steps and/or procedures of the exemplary embodiments of method of FIGS. 4 and 5. For example, an external device, such as an MRI sensor 620, can provide data to the processor 610. This data can be associated with, for example, at least one portion of an anatomical structure. Other sensors and/or external devices or arrangements can be used to provide various type of data, e.g., external processors, environmental sensors, etc According to one exemplary embodiment of the present invention, the data can be received via a communication device 680 (e.g., an Ethernet card, LAN card, etc.), and the data can be stored in a storage arrangement 630 (e.g., hard drive, memory device, such as RAM, ROM, memory stick, floppy drive, etc.). The processor 610 can access the storage arrangement 630 to execute a computer program or a set of instructions (stored on or in the storage arrangement 630) which perform the procedures according to the exemplary embodiments of the present invention. Thus, e.g., when the processor 610 performs such instructions and/or computer program, the processor can be configured to perform the exemplary embodiments of the procedures according to the present invention, as described herein. For example, such configured processor 610 can establish a functionality of a data receiver 630, a data transformer 640 and a likelihood estimator 650. The data receiver 630 can program the processor 610 to cause the communication device 680 to receive data from the MRI sensor 620 or other external device, and such data can be provided, e.g., via the storage arrangement 630, to the functionality of the data receiver 630 in a one or two-dimensional format, and/or the data receiver 630 can configure the processor 610 to convert the data received into a one or two-dimensional format, three-dimensional format, or other multi-dimensional format. The data can be received by or converted into the form of an n×m matrix, which corresponds to m independent observations of n variables. The data receiver 630 can then cause the processor 610 to provide the data to a functionality of the data transformer 640.

The data transformer 640 then cause the processor 610 to apply a transformation to the received data from the functionality of the data receiver 630 that transforms at least a portion of the received data provided as a predetermined distribution. The exemplary transformation procedure of the data can be as set out above in FIGS. 4 and/or 5. The data transformer 640 can cause the processor 610 to repeat the transformations until a marginal distribution of the at least the portion of the received data has been transformed to be at least sufficiently near to or reach the predetermined distribution. When at least a portion of the received data is transformed to be at least sufficiently near to or reach the predetermined distribution, the likelihood estimator 650 then cause the processor 610 to estimate one or more likelihoods of at least one predetermined result associated with the received data as a function of the transformed data.

A display 670 can also be provided for the exemplary system of FIG. 6. The storage arrangement 630 and the display 670 can be provided within the computer 600 or external from the computer 600. As indicated herein above, the storage arrangement 660 can store the received data from the external device 620, the transformed data from the processor 610 as configured by the data transformer 640, and/or the one or more likelihoods from the processor 610 as configured by the likelihood estimator 650, which can be provided to a user in a user-accessible format. One or more likelihoods or the received or transformed data to the user can be displayed on the display 670 in a user-readable format.

Provided below is a detailed description of each of the components of the exemplary embodiment of the procedure according to the present invention.

A. Exemplary Single Variable Normalization

Each row i of the matrix X in FIG. 5 can consist of a sample $x_i^j, j=1, \ldots, m$, obtained from a typically unknown marginal probability distribution $\mu_i$. A key ingredient of the exemplary methodology described herein is an exemplary procedure to map each variable $x_i$ independently into another variable $x_i$, whose marginal probability distribution is a Gaussian:

$$g_i(x_i^j) = \frac{e^{-\frac{1}{2}(x_i^j/\sigma_i)^2}}{\sqrt{2\pi\sigma}} \quad (2.4)$$

with standard deviation $\sigma_i=1$. As explained below, a small step in the direction of Gaussianization can be performed. An exemplary embodiment of the full Gaussianization procedure is described herein below.

Since the current subsection describes this single-variable problem, it may be possible to omit on the subindex i denoting which variable is being normalized, as well as the adjective "marginal" denoting integration over all the other variables. The problem can be then be to determine a map x'(x) so that the probability density of the transformed variable x' is the Gaussian density.

If the probability density $\rho(x)$ of the original variable x can be known, the exemplary Gaussianization procedure can be straightforward, e.g., it may be possible to determine the cumulative distribution:

$$P(x) = \int_{-\infty}^{x} \rho(y) dy \quad (2.5)$$

and equate it to the one corresponding to a Gaussian, $$P(x) = G(x'(x)) = \int_{-\infty}^{x'(x)} \frac{e^{-\frac{1}{2}(y/\sigma)^2}}{\sqrt{2\pi\sigma}} dy, \quad (2.6)$$

to determine x'(x).

In practice, however, $\rho(x)$ may not be known, e.g., a finite-size sample, $x^j, j=1, \ldots, m$, may be provided. Since it may be difficult to determine a full probability density from a single sample, the Gaussianization can only be performed in a particular parametric sense.

In order to produce the exemplary normalizing map, the equation below can be used, which displays the theoretical map described above: it is possible to go up from x to P(x), equate such information to G(x'(x)), the cumulative distribution of a Gaussian, and then descend, inverting G(x') to find x'.

$$\int_{-\infty}^{x} p(y) dy \quad \rightarrow \quad \int_{-\infty}^{x'(x)} \frac{e^{-\frac{1}{2}(y/\sigma)^2}}{\sqrt{2\pi\sigma}} dy$$
$$\uparrow \qquad \qquad \downarrow$$
$$x \qquad \rightarrow \qquad x'(x)$$

This exemplary equation indicates that the exemplary procedure described herein, being executed through the cumulative distribution P, can be avoided: Instead of attempting to approximate $\rho$ or P, it is possible to approximate directly x'(x), making it a member of the parametric family x' (x; a). For every such map, the implied probability density $\rho(x)$ can follow straightforwardly, since x' is Gaussian by the following construction:

$$\rho(x) = \frac{dx'}{dx} \frac{e^{-\frac{1}{2}(x'(x)/\sigma)^2}}{\sqrt{2\pi\sigma}}$$

The exemplary joint probability density of the full sample $(x^1, \ldots, x^m)$ can be given by:

$$p((x^1, \ldots, x^m)) = \Pi \rho(x^j).$$

Then, the parameters a of the map can be selected so as to maximize this probability density of the observed sample, in a maximum-likelihood estimator (MLE).

Such direct exemplary parameterization of x'(x) is the procedure that has been implemented for the examples described herein. It can be beneficial to review the family of parameterized maps x'(x,a) to choose from. For the examples provided above, the following exemplary simple six-parameter family of maps can be implemented:

$$x'(x) = \begin{cases} x'_0 + ((x_l - x(x))^{\alpha_l} - x_l^{\alpha_l}) & \text{if } x_n(x) < 0 \\ x'_0 + ((x_r - x_n(x))^{\alpha_l} - x_l^{\alpha_l}) & \text{if } x_n(x) \geq 0 \end{cases} \quad (2.7)$$

where $$x_n(x) = \frac{x - x_0}{\sigma}, \quad x_l = \left(\frac{\beta}{\alpha_l}\right)^{1/(\alpha_l - 1)}, \quad x_r = \left(\frac{\beta}{\alpha_l}\right)^{1/(\alpha_l - 1)}, \quad (2.8)$$

The exemplary parameters are $\sigma > 0$, $x_0 \in R$, $x'_0 \in R$, $\alpha_l > 0$, $\alpha_r > 0$, $\beta > 0$.

The exemplary family can have two possibly different power laws on the left and right, to tame non-Gaussian tails, and an arbitrary slope in the middle. In addition, the original variable x may be displaced and stretched, and the center $x_0$ may be mapped onto an arbitrary point $x'_o$ of the Gaussian distribution (this permits strongly asymmetric distributions to be represented).

In the context of the exemplary procedure of the present invention, it may be beneficial not to choose our map from a family such as the one above without further limitations, and rather to constrain it through the allowed range of parameters, to be close to the identity map $x'=x$. In the case of the exemplary family described above, this can be achieved, e.g., through constraints of the form $|\alpha_l-1|<\epsilon$, $|\alpha_r-1|<\epsilon$ and $|\beta-1|<\delta$, where $\epsilon$ and $\delta$ are small. This may be due to a marginal distribution being handled that may, for a range of values, result from contributions from disjoint areas of the full space of variables, as shown in the exemplary illustration of FIG. 1. At the time of normalizing the marginal, the contribution from these disjoint areas can be indistinguishable, and the corresponding values of the marginal distribution may be mapped together. If the deformation imposed by this exemplary map is substantial, it may result in an irreversible loss of information: one component of the observational set may be erroneously displaced with respect to the others.

However, which areas of phase space are joined together in a marginal distribution may depend on the orientation of the line along which the marginal can be determined. The exemplary embodiment of the procedure according to the present invention described herein can utilize a set of random rotations (e.g., orthogonal transformations), that can continuously change the orientation of the variables. Hence, if only small changes are allowed in each normalizing step, these changes can add up constructively, e.g., only when they are robust under orientation changes. Features that can depend on the coincidental juxtaposition of distinct areas of phase space under a projection may not be robust in this way, and may likely not affect the outcome of the exemplary embodiment of the procedure according to the present invention.

In summary, the exemplary Gaussianizing procedure can be reduced to its nearly minimal expression, e.g., to maps that move the distribution slightly toward the Gaussianity. The selection of these maps from a parametric family through a maximal-likelihood estimator may be one of many possible choices. Other exemplary embodiments can include a consideration of smoothed versions of the empirical cumulative distribution $P_e(x)$ to replace $P(x)$ in (2.6); parameterizing directly the probability density $p(x)$, and/or determining an approximation to this through, for instance, minimizing its information entropy, under the constraint that a specified number of its moments agree with their estimates based on the sample $x^j$.

B. Exemplary Joint Gaussianization Through Random Rotations

Applying the exemplary embodiment of the procedure according to the present invention described above to each row of the matrix X, it may be possible to map such result into a new matrix X', whose columns can be viewed as samples of an underlying multivariable distribution, with marginals for each individual variable that are somewhat closer to Gaussian than in the original X. Even if each row of X' is a sample from a perfectly Gaussian distribution, the multivariable distribution underlying X' does not (and generally would not) have to be jointly Gaussian, e.g., the variables may be linked in an arbitrary fashion. Linear combinations of jointly Gaussian variables may also be Gaussian; this may not necessarily be the case for linear combinations of the rows of X'. In particular, it is possible to apply to X' a linear transformation, $$X''=U^T X'$$

and obtain a new matrix X" whose rows would no longer have Gaussian marginal distributions. It is possible to restrict U to be orthogonal, which can facilitate a number of convenient properties, such as invertibility, area preservation and well-conditioning, and may ensure that all variables are in a sense given equal weight (e.g., more general transformations can be considered, provided that they remain well-conditioned.)

Since the rows or X" may no longer be necessarily Gaussian even if the ones of X' had been, it is possible to apply again the single-variable exemplary Gaussianization procedure described herein to each of them. Then, a new rotation U can be selected, and the exemplary procedure can be iterated until a convergence criterion is met. U may be chosen randomly among all orthogonal transformations. Randomness, however, is not a requirement, e.g., a deterministic choice can work as well, provided that it mixes the variables uniformly enough.

An exemplary convergence of the procedure can be described as follows. Convergence can mean that, e.g., after arbitrary rotations, the variables remain Gaussian. If this is the case, the transformed variables can have, at such point, a jointly-Gaussian distribution, e.g., such distributions are the only ones that have marginal Gaussianity along all lines through the origin.

One reason to expect the convergence is that combining variables (e.g., "mixing" them, in a more thermodynamical language) can per se move them toward Gaussianity, as described herein, for example, by the Central Limit Theorem or, in more physical terms, by the second principle of thermodynamics. Thus, the combination of variables through rotations and the forced individual variable normalizations, may both tend toward reaching a state of maximal entropy, e.g., a jointly Gaussian state.

In order to extract the maximal amount of information from a set of observations, the variables can be mixed, a procedure that can often be associated with information loss. This apparent contradiction of the second law of thermodynamics can be understood by reviewing that, while mixing, it is possible to track the performed transformations. This can "unmix" the variables when in need to invert the transformation, and also record most or all volume deformations into the Jacobian, the element of the probability distribution that "remembers" the geometry of the original space when the now Gaussian variables themselves do not.

In each step and/or procedure of the exemplary embodiment of the procedure according to the present invention, individual normalization and rotation can be invertible. Thus, after convergence, it is possible to provide an invertible map between the original variables and a set of jointly-Gaussian ones. Moreover, the Jacobian of this exemplary map can be determined, e.g., the Jacobian of an orthogonal transformation is one, while that of the set of individual normalizations is given by the determinant of a diagonal matrix, namely $$J = \prod_{i=1}^{n} \frac{dx'_i}{dx_i}.$$

Thus, translating the Gaussian distribution of the transformed variables x to a joint distribution for the original variables x is straightforward, involving the multiplication by a known Jacobian.

C. General Applications

When a joint probability distribution is assigned to the variables of interest, various questions about the variables can be posed and answered. Three general types of exemplary applications can be, e.g., (i) importance sampling, (ii) dimensional reduction, and (iii) data estimation. For the importance sampling, an estimate of the expected value E(f) of a function ƒ (x) that has significant weight in areas of relatively small probability may be determined. For the dimensional reduction, it may be important to determine whether the observations could be explained by a smaller set of "latent" variables, that parameterize the manifold where the observations live. Curve and surface fitting may belong in this exemplary category. For the data estimation, it may be important to predict the outcome of an experiment, or to assess the likelihood of an event, given the values of some of the variables. In medicine, e.g., it is possible to measure a patient's clinical or genomic variables, and diagnose the likelihood of some medical condition. In the financial world, it may be important to estimate the current price of a credit derivative, given the state of the various companies comprising the asset.

Provided below, a description of how these exemplary tasks can be performed is provided within the context of the exemplary methodology and procedure described herein.

D. Importance Sampling

A frequent problem in applications is the estimation of the expected value E(f) of a function ƒ(x), where x is a random vector variable with unknown probability density f(x). A standard Montecarlo approach would estimate E(f) by its average over a sample of x, $$\mathbb{E}(f) \approx \bar{f} = \frac{1}{m} \sum_{j=1}^{m} f(x^j)$$

However, if ƒ has a relatively small support, or else it peaks pronouncedly in areas with comparatively little probability, this direct Montecarlo simulation could be very ineffective. Moreover, it can be the case that the number of observations available is too small for a Montecarlo estimation to have any accuracy.

Importance sampling is a variance reduction technique that circumvents these problems, by tailoring an alternative probability density ¶(x) to the shape off, so that sampling x with probability ¶(x) typically visits the areas with largest impact on the estimation of E(f); and determining:

$$E(f) \approx \bar{f} = \sum_{j=1}^{M} f(x^j) v_j$$

where $$w(x^j) = \frac{\rho(x^j)}{\pi(x^j)}$$

is the importance weight and $$v_j = \frac{\omega(x^j)}{\sum_{j=1}^{M} \omega(x^j)}$$

is the normalized importance weight

It is possible that the methodology described herein fits this procedure ideally, since, given a sample $x^j$ drawn from the tailored probability density ¶(x), it provides a robust estimate for the corresponding values of the required real density, ρ($x^j$).

E. Exemplary Data Estimation

A frequent problem in applications is that of data estimation, e.g., there may be an interest in diagnosing the state of one or more variables, given the observed values of some others. In addition, a training population can be provided, where all variables, including those that one would like to eventually diagnose, have been observed.

One way of using the exemplary procedure according to the present invention to achieve this exemplary goal can depend on whether the variable to diagnose (it is possible to assume for conciseness that there is only one; the extension of the exemplary procedure to a set of diagnostic variables is straightforward) is continuous or discrete. For example, it is possible to consider the case where the other variables, the ones observable also in the testing population, are all continuous.

F. Exemplary Diagnosing of a Continuous Variable

When the variable to diagnose is continuous, it is possible to include such variables in the matrix X (e.g., the training population, for which all variables have been observed) alongside the other variables it might be related to. Then the exemplary procedure according to the present invention can provide the joint probability distribution of all variables, which may be used in order to diagnose one given a knowledge of the others.

An exemplary way to carry out the diagnosis can be, e.g., if the values of all other variables, $y_i$, i=2, ..., n are provided for one more observation, and it is important to determine the conditional probability density of $y_l$, it is possible to concatenate to X a matrix Y, which has for first row a discretization of all possible values of $y_l$, while the other rows repeat the known corresponding values $y_i$. Then, carrying Y alongside X passively through the exemplary central procedure, can generate, after normalization (e.g., a division by the total probability), the probability density of $y_l$ conditioned to the observed values of all the other $y_i$'s.

G. Diagnosing a Discrete Variable

When the variable to diagnose can preferably only have a discrete number of outcomes, it may not likely be Gaussianized along the rest. Instead, it is possible to partition the training population into sub-populations, each corresponding to one value of the outcome. The exemplary procedure according to the present invention can be applied to the observations of the continuous variables x in each of these sub-populations, yielding the conditional probability density $$\rho(x|x_0=v_k)$$

where $x_o$ denotes the variable to diagnose, and $v_k$ its discrete possible values. Then, if a prior probability $P_{prior(x_0=V_k)}$ is known (typically, the proportion of the training population having xo=$V_k$), we can compute the probability of $V_k$ given an observation of x, using Bayes' theorem:

$$P(x_0 = v_k | x) = \frac{P_{prior}(x_0 = v_k)\rho(x | x_0 = v_k)}{\sum_l P_{prior}(x_0 = v_l)\rho(x | x_0 = v_l)}.$$

The density-estimation procedure can be used as the core of a classification procedure. In particular, this can be applied to medical diagnosis, such as the classification of tumors based on microarray data. In these applications, where one has typically many variables (such as the expression level of 20,000 genes) and a relatively small training population (typically in the hundreds), it may be convenient to include the testing data in the density-estimation procedure, softly attributed to the various classes with a weight that depends on its current probability of belonging to each class, in the spirit of the electromagnetic methodology.

The exemplary procedure is easily parallelizable. First, the move toward Gaussianization of each variable is independent of all the others in each time step, and can be performed separately. Second, because the time-steps are small, they are independent to leading order: various time-steps can be performed at once, with different rotation matrices and Gaussianization nodes.

The exemplary methodology and procedure according to the present invention is described herein which can provide a robust estimate for the joint probability distribution underlying a multivariable observational sample. The exemplary procedure can map the original variables onto a jointly Gaussian set, using near-identity, one-dimensional maps that push the marginal distribution of each variable toward Gaussianity, and rotations that mix the n variables so that their joint information entropy grows.

The exemplary methodology and procedure may be applicable to, e.g., almost any problem in data mining, including missing data estimation, importance sampling, and dimensional reduction. Since data mining is of nearly universal use, there is a plethora of applications to medicine, to the natural and human sciences, and to the financial world.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements, and methods which, although not explicitly shown or described herein, embody the principles of the invention and are thus within the spirit and scope of the invention. In addition, all publications and references referred to above are incorporated herein by reference in their entireties. It should be understood that the exemplary procedures described herein can be stored on any computer accessible medium, including a hard drive, RAM, ROM, removable disks, CD-ROM, memory sticks, etc., and executed by a processing arrangement which can be a microprocessor, mini, macro, mainframe, etc.

What is claimed is:

1. A non-transitory computer-accessible medium having instructions thereon wherein, when a processing arrangement executes the instructions, the processing arrangement is configured to execute procedures comprising:
   (a) transforming at least a portion of particular data into transformed data;
   (b) repeating the transformation until a marginal distribution of at least the portion of the particular data has been transformed to be at a predetermined distribution; and
   (c) estimating at least one likelihood of at least one predetermined result associated with the particular data as a function of the transformed data, wherein the repeated transformation at least one of (i) ascends a gradient of a likelihood function, or (ii) is performed by unitary transformations.

2. The computer-accessible medium according to claim 1, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

3. The computer-accessible medium according to claim 1, wherein the likelihood function is a log likelihood function.

4. The computer-accessible medium according to claim 1, wherein the unitary transformations are uniformly distributed.

5. The computer-accessible medium according to claim 1, wherein the transformation is performed by at least one-dimensional non-linear transformations.

6. The computer-accessible medium according to claim 1, wherein the transformation is performed by a non-linear transformation.

7. The computer-accessible medium according to claim 1, wherein the processing arrangement is further configured to receive the particular data in at least a one-dimensional format.

8. The computer-accessible medium according to claim 1, wherein the predetermined distribution is a Gaussian distribution.

9. The computer-accessible medium according to claim 8, wherein the Gaussian distribution is an isotropic Gaussian distribution.

10. The computer-accessible medium according to claim 1, wherein the transformed data satisfies a predetermined Gaussianity evaluation.

11. The computer-accessible medium according to claim 1, wherein the at least the portion of the particular data is transformed using a non-linear transformation procedure.

12. The computer-accessible medium according to claim 1, wherein the at least the portion of the particular data is transformed using a random orthogonal transformation which rotates the particular data.

13. The computer-accessible medium according to claim 1, wherein the particular data has a form of an n×m matrix, whereas m is associated with independent observations of n variables.

14. A method for providing information from data, comprising the steps of:
   (a) transforming at least a portion of particular data into transformed data;
   (b) repeating the transformation until a marginal distribution of at least the portion of the particular data has been transformed to be at a predetermined distribution; and
   (c) using a computer hardware arrangement, estimating at least one likelihood of at least one predetermined result associated with the particular data as a function of the transformed data, wherein the repeated transformation at least one of (i) ascends a gradient of a likelihood function, or (ii) is performed by unitary transformations.

15. The method according to claim 14, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

16. The method according to claim 14, wherein the likelihood function is a log likelihood function.

17. The method according to claim 14, wherein the unitary transformations are uniformly distributed.

18. The method according to claim 14, wherein the transformation is performed by at least one-dimensional non-linear transformations.

19. The method according to claim 14, wherein the transformation is performed by a non-linear transformation.

20. The method according to claim 14, wherein the particular data is received in at least a one-dimensional format.

21. The method according to claim 14, wherein the predetermined distribution is a Gaussian distribution.

22. The method according to claim 21, wherein the Gaussian distribution is an isotropic Gaussian distribution.

23. The method according to claim 14, wherein the transformed data satisfies a predetermined Gaussianity evaluation.

24. The method according to claim 14, wherein the at least the portion of the particular data is transformed using a non-linear transformation procedure.

25. The method according to claim 14, wherein the at least the portion of the particular data is transformed using a random orthogonal transformation which rotates the particular data.

26. The method according to claim 14, wherein the particular data has a form of an n×m matrix, whereas m is associated with independent observations of n variables.

27. A system for providing information from data, comprising:
a computer arrangement which, upon an execution of a software program embodied on a computer-readable medium, is configured to perform procedures comprising:
  (a) transform at least a portion of particular data into transformed data;
  (b) repeat the transformation until a marginal distribution of at least the portion of the particular data has been transformed to be at a predetermined distribution; and
  (c) estimate at least one likelihood of at least one predetermined result associated with the particular data as a function of the transformed data, wherein the repeated transformation at least one of (i) ascends a gradient of a likelihood function, or (ii) is performed by unitary transformations.

28. The system according to claim 27, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

29. A non-transitory computer-accessible medium having instructions thereon wherein, when a processing arrangement executes the instructions, the processing arrangement is configured to execute procedures comprising:
  (a) transforming at least a portion of particular data into transformed data;
  (b) repeating the transformation until a marginal distribution of at least the portion of the particular data has been transformed towards a predetermined distribution; and
  (c) estimating at least one likelihood of at least one predetermined result associated with the particular data as a function of the transformed data, wherein the repeated transformation at least one of (i) ascends a gradient of a likelihood function, or (ii) is performed by unitary transformations.

30. The computer-accessible medium according to claim 29, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

31. The computer-accessible medium according to claim 29, wherein the transformed data satisfies a predetermined Gaussianity evaluation.

32. The computer-accessible medium according to claim 29, wherein the particular data has a form of an n×m matrix, whereas m is associated with independent observations of n variables.

33. A method for providing information from data, comprising the steps of:
  (a) transforming at least a portion of particular data into transformed data;
  (b) repeating the transformation until a marginal distribution of at least the portion of the particular data has been transformed towards a predetermined distribution; and
  (c) using a computer hardware arrangement, estimating at least one likelihood of at least one predetermined result associated with the particular data as a function of the transformed data, wherein the repeated transformation at least one of (i) ascends a gradient of a likelihood function, or (ii) is performed by unitary transformations.

34. The method according to claim 33, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

35. The method according to claim 33, wherein the transformed data satisfies a predetermined Gaussianity evaluation.

36. The method according to claim 33, wherein the particular data has a form of an n×m matrix, whereas m is associated with independent observations of n variables.

37. A system for providing information from data, comprising:
a computer arrangement which, upon an execution of a software program embodied on a computer-readable medium, is configured to perform procedures comprising:
  (a) transform at least a portion of particular data into transformed data;
  (b) repeat the transformation until a marginal distribution of at least the portion of the particular data has been transformed towards a predetermined distribution; and
  (c) estimate at least one likelihood of at least one predetermined result associated with the particular data as a function of the transformed data, wherein the repeated transformation at least one of (i) ascends a gradient of a likelihood function, or (ii) is performed by unitary transformations.

38. The system according to claim 37, wherein the repeated transformation further comprises a combination of a change of coordinates, which are linear and unitary, and low-dimensional transformations that move at least one or more marginals of a probability distribution underlying the transformed data toward corresponding marginals of the predetermined distribution.

39. The system according to claim 37, wherein the transformed data satisfies a predetermined Gaussianity evaluation.

40. The system according to claim 37, wherein the particular data has a form of an n×m matrix, whereas m is associated with independent observations of n variables.

* * * * *

UNITED STATES PATENT AND TRADEMARK OFFICE
CERTIFICATE OF CORRECTION

| | | |
|---|---|---|
| PATENT NO. | : 8,577,828 B2 | Page 1 of 1 |
| APPLICATION NO. | : 12/808153 | |
| DATED | : November 5, 2013 | |
| INVENTOR(S) | : Esteban G. Tabak | |

It is certified that error appears in the above-identified patent and that said Letters Patent is hereby corrected as shown below:

On the Title Page, Item (54) and in the Specification, Column 1, Lines 1-4, modify the title as follows:

"SYSTEM, METHOD AND COMPUTER-ACCESSIBLE MEDIUM FOR NORMALIZING DATABASES THROUGH MIXING"

Signed and Sealed this
Third Day of June, 2014

Michelle K. Lee
*Deputy Director of the United States Patent and Trademark Office*